(12) United States Patent
Hatta et al.

(10) Patent No.: US 9,742,025 B2
(45) Date of Patent: Aug. 22, 2017

(54) BATTERY PACK

(71) Applicant: NISSAN MOTOR CO., LTD., Yokohama-shi, Kanagawa (JP)

(72) Inventors: Kentaro Hatta, Kawasaki (JP); Keisuke Satou, Ebina (JP); Ryuichi Amagai, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 263 days.

(21) Appl. No.: 14/423,873

(22) PCT Filed: Aug. 9, 2013

(86) PCT No.: PCT/JP2013/071618
§ 371 (c)(1),
(2) Date: Feb. 25, 2015

(87) PCT Pub. No.: WO2014/045756
PCT Pub. Date: Mar. 27, 2014

(65) Prior Publication Data
US 2015/0270570 A1 Sep. 24, 2015

(30) Foreign Application Priority Data
Sep. 18, 2012 (JP) ................................. 2012-204139

(51) Int. Cl.
*H01M 10/04* (2006.01)
*H01M 2/10* (2006.01)

(52) U.S. Cl.
CPC ..... *H01M 10/0481* (2013.01); *H01M 2/1077* (2013.01); *H01M 10/0413* (2013.01); *H01M 10/0472* (2013.01); *H01M 2/1061* (2013.01)

(58) Field of Classification Search
None
See application file for complete search history.

(56) References Cited

U.S. PATENT DOCUMENTS

2011/0165451 A1 7/2011 Kim et al.
2012/0141855 A1 6/2012 Okada et al.

FOREIGN PATENT DOCUMENTS

| CN | 102593388 A | 7/2012 |
|---|---|---|
| EP | 2423999 A1 | 2/2012 |
| JP | 2001-236937 A | 8/2001 |
| JP | 2001236937 * | 8/2001 |

(Continued)

*Primary Examiner* — Patrick Ryan
*Assistant Examiner* — Christopher Domone
(74) *Attorney, Agent, or Firm* — Young Basile Hanlon & MacFarlane, P.C.

(57) ABSTRACT

A battery pack includes a module stack body having a plurality of stacked battery modules; first and second connecting members each provided on the same surface of the module stack body in order to hold the stacked battery modules and extending in the stacking direction of the battery modules; a first reinforcing member fixed to the first and second connecting members at first and second fixed points; and a second reinforcing member fixed to the first and second connecting members at third and fourth fixed points. Orientation of the components along the stacking direction of the battery modules of vectors having respectively the first and third fixed points as a start point and the second and fourth fixed points as an end point are opposed to each other.

7 Claims, 8 Drawing Sheets

(56) References Cited

FOREIGN PATENT DOCUMENTS

| JP | 2012-018915 | A | | 1/2012 |
|----|-------------|---|---|--------|
| JP | 2012123905 | A | | 6/2012 |
| JP | 2012-146588 | A | | 8/2012 |
| JP | 2012146588 | | * | 8/2012 |

* cited by examiner

BATTERY PACK

CROSS REFERENCE TO RELATED APPLICATION

The present application claims priority to Japanese Patent Application No. 2012-204139, filed Sep. 18, 2012, incorporated herein in its entirety.

TECHNICAL FIELD

The present invention relates to an assembled battery or a battery pack constructed by stacking a plurality of battery modules.

BACKGROUND

A technique for fixing a plurality of stacked battery cells by tie bars or bands is known (see, for example, Japanese Patent Application Publication No. 2012-18915 A). In Japanese Patent Application Publication No. 2012-18915 A, although the plurality of battery cells stacked can be effectively suppressed from being deformed by expansion of the battery cells or the like, when external force is applied along the stacking direction of the battery cells, there is a problem that the plurality of battery cells of the battery cell may sometimes be tilted in a chain reaction triggered by the battery cell receiving the external force.

SUMMARY

The object to be attained by the present invention is to provide an assembled battery or a battery pack that is held stably even if the external force is applied along the stacking direction of the battery cells.

The battery pack according to the present invention is provided with a first connecting member, a second connecting member, a first reinforcing member fixed to the first and second connecting members at a first fixed point and a second fixed point, respectively, and a second reinforcing member fixed to the first and second connecting members at a third fixed point and a fourth fixed point, respectively.

Further, by setting the direction of a component along the stacking direction of the battery modules in a first vector having the first fixed point as a start point and the second fixed point as end point and the direction of a component along the stacking direction of the battery modules in a second vector having the third fixed point as a start point and the fourth fixed point as end point opposite to each other, the problem described above is solved.

According to the present invention, when an external force is applied to the battery pack along the stacking direction of the battery modules, one of the first and second reinforcing members is disposed to be inclined so as to counteract the external force. Therefore, it is possible for the stacked battery modules to be suppressed from being tilted by the external force.

DETAILED DESCRIPTION OF THE EMBODIMENTS

A description will be given below of embodiments according to the present invention with reference to the drawings.

First Embodiment

Figure 1:
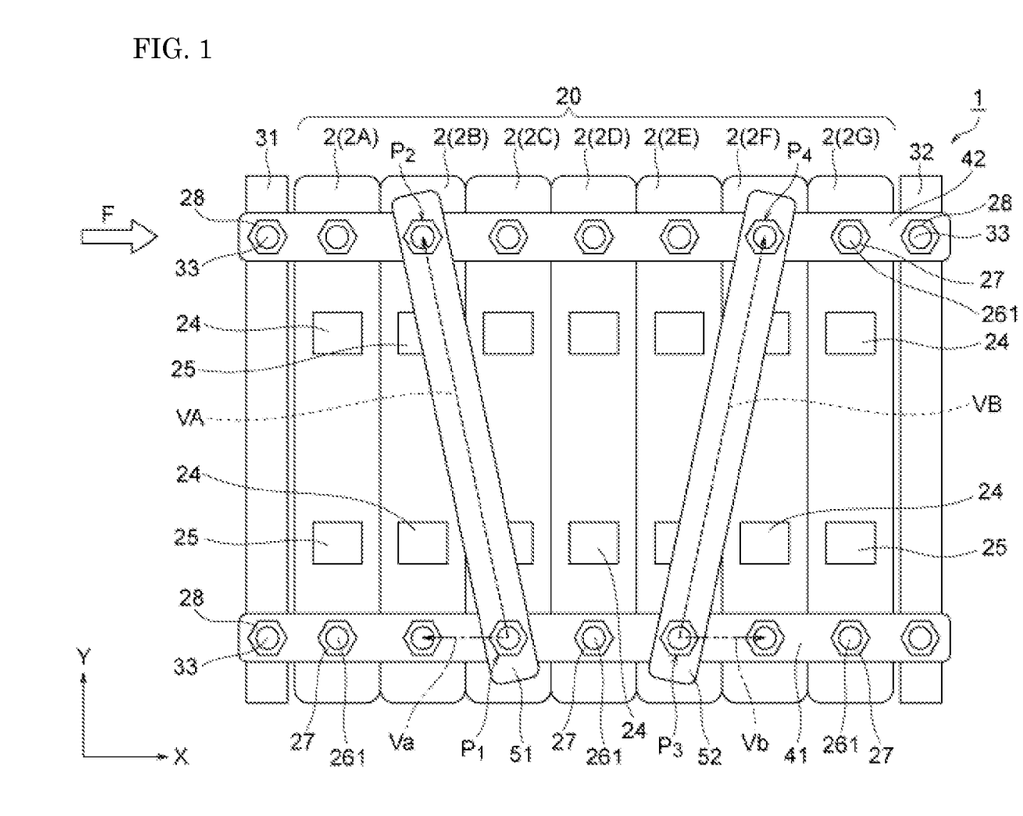
FIG. 1 is a front view showing the battery pack in a first embodiment according to the present invention.
Figure 2:
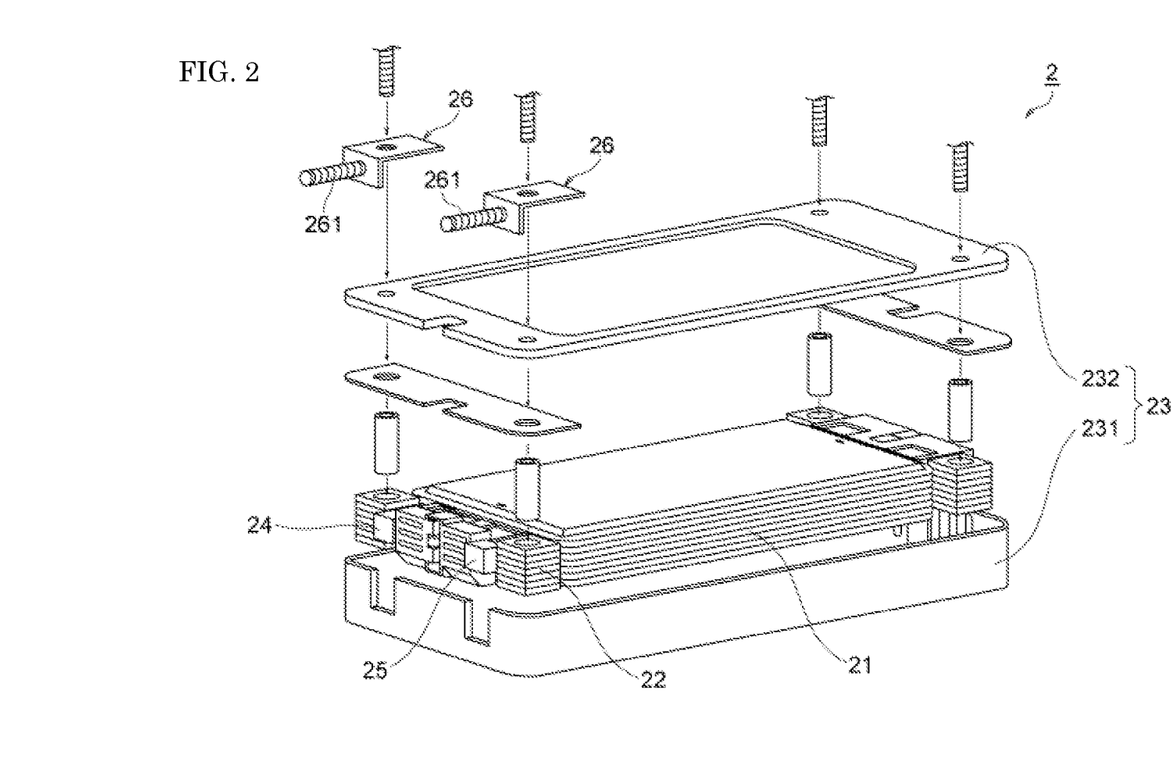
FIG. 2 is an exploded perspective view of a battery module according to the first embodiment according to the present invention.
Figure 3:
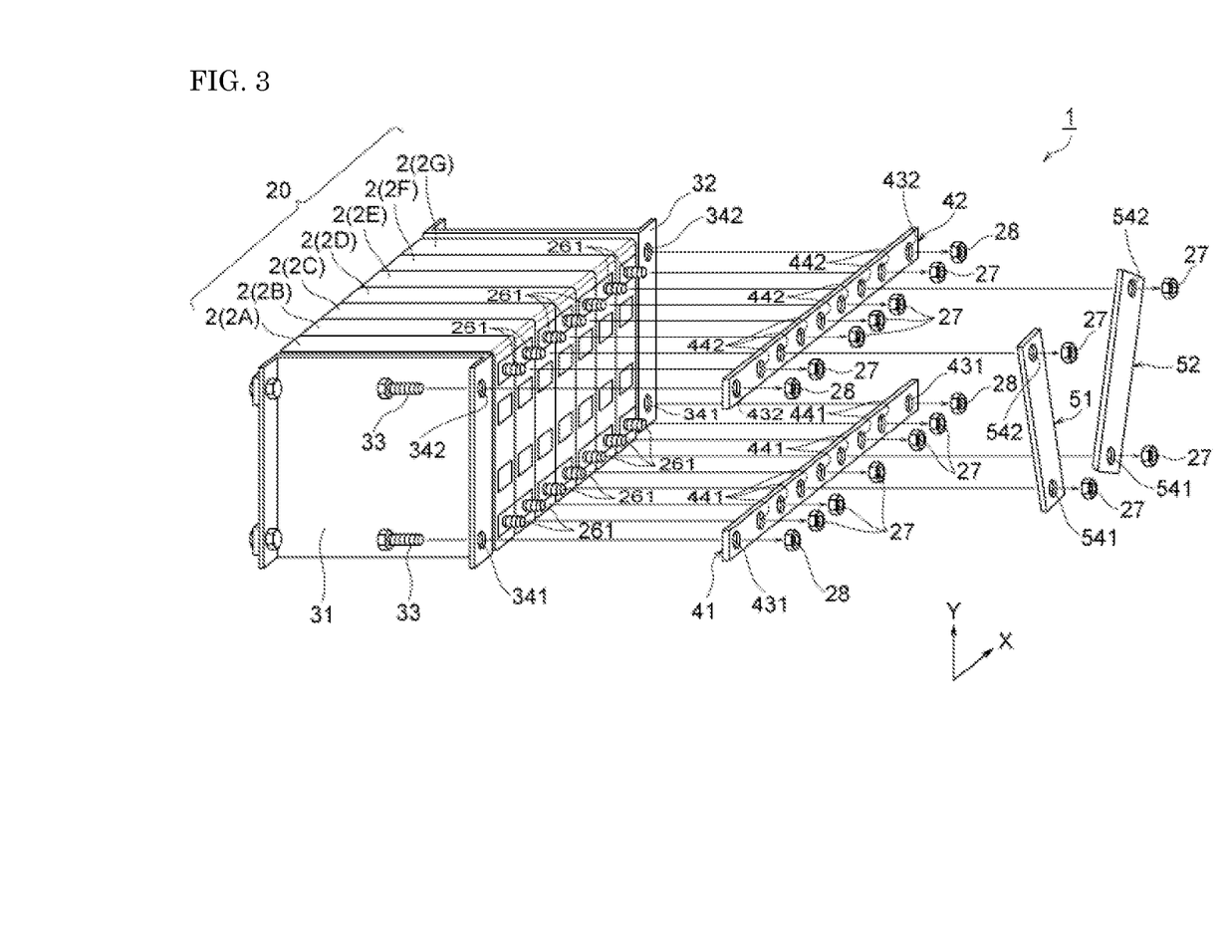
FIG. 3 is a partially exploded perspective view showing the battery pack in the first embodiment according to the present invention.
Figure 4:
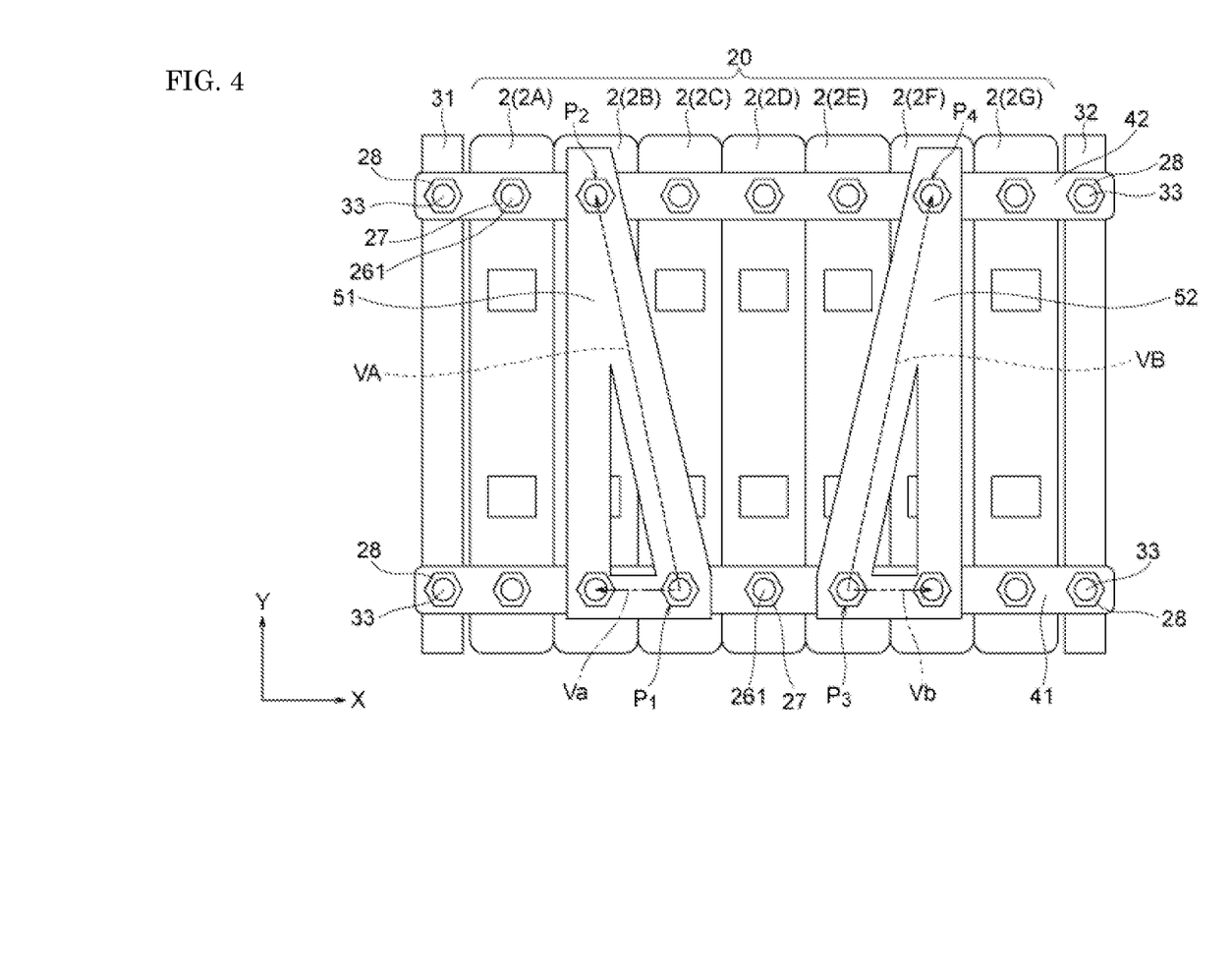
FIG. 4 is a front view showing a first modification of a reinforcing member in the first embodiment according to the present invention.
Figure 5:
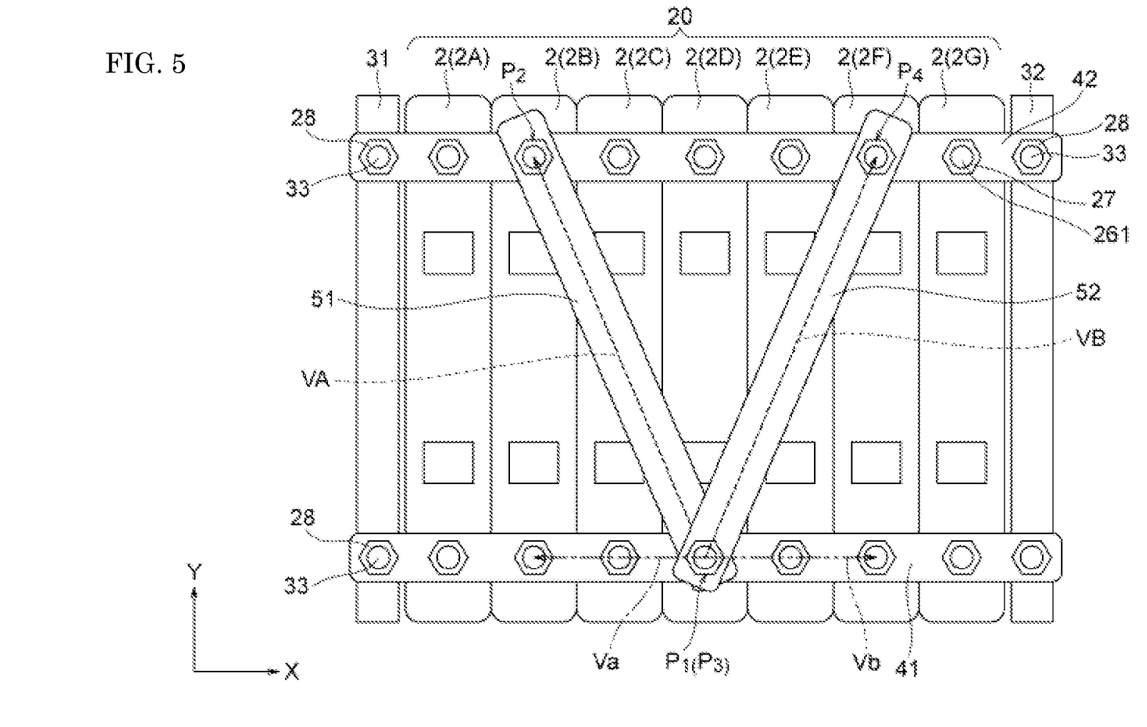
FIG. 5 is a front view showing a second modification of the reinforcing member in the first embodiment according to the present invention.
Figure 6:
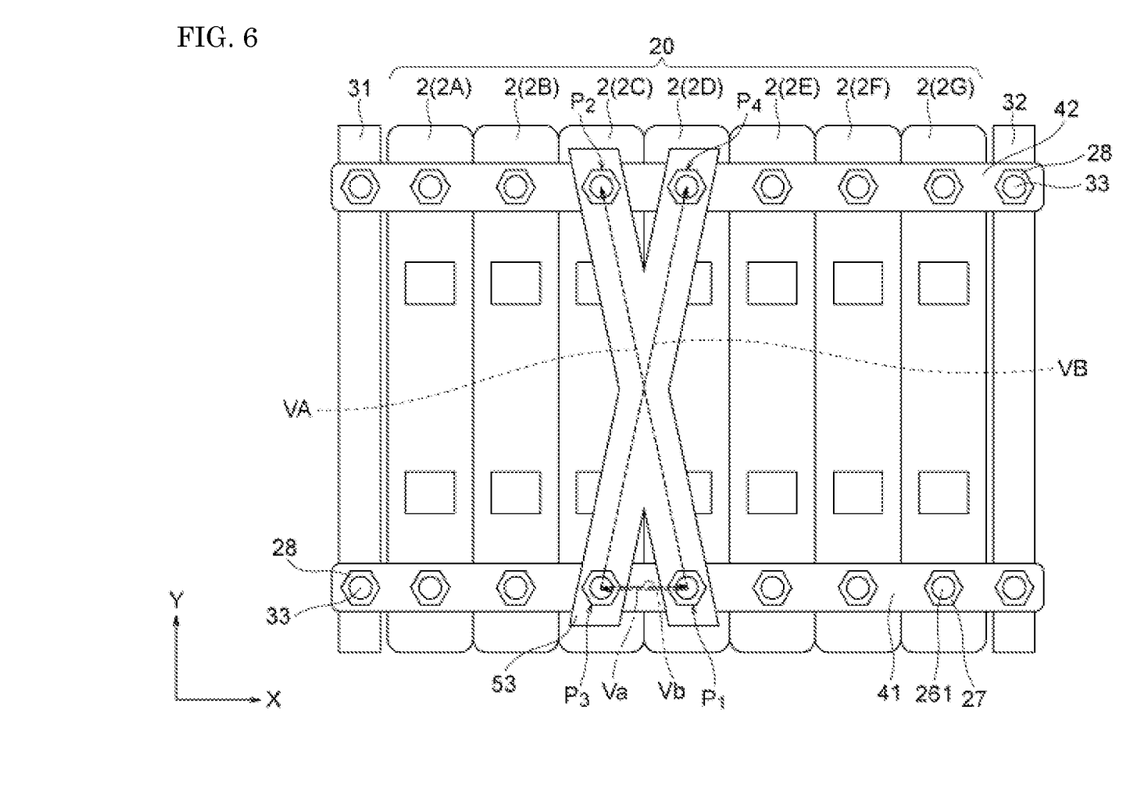
FIG. 6 is a front view showing a third modification of the reinforcing member in the first embodiment according to the present invention.

FIG. 1 is a front view showing the battery pack 1 in this embodiment, FIG. 2 shows an exploded perspective view of a battery module 2 in the present embodiment, FIG. 3 is a partial exploded perspective view showing the battery pack 1, and finally, FIGS. 4 to 6 are front views respectively showing a first to a third modifications of the reinforcing members 51 and 52 in the instant embodiment.

A battery pack 1 according to the instant embodiment, as shown in FIG. 1, is provided with a module stack body 20, a first and a second end plates 31, 32 respectively provided on the left and right sides of the module stack body 20 in the figure, a first and second connecting members 41, 42 fixedly connecting the first and second end plates 31, 32, and a first and second reinforcing members 51, 52 reinforcing the assembled battery pack 1 by connecting the first and second connecting members 41, 42.

The module stack body 20, as shown in FIG. 1, is a laminate body composed of a plurality of battery modules 2 stacked in a row in the X direction in FIG. 1. Note that each of the battery modules 2 is fixedly connected to each other by through bolts (not shown).

The module stack body 20 in the instant embodiment thereby constitutes a battery pack 1 using seven battery modules 2. However, the number of battery modules 2 that form the battery pack 1 is not particularly limited. In the following, these seven cell modules 2 are also referred to as a battery module 2A, a battery module 2B, a battery module 2C, a battery module 2D, a battery modules 2E, a battery module 2F, and a battery modules 2G, respectively.

The battery module 2, as shown in FIG. 2, is provided with a plurality of single or unit cells 21 stacked on each other, a spacer 22 interposed between the unit cells 21, a case 23 that accommodate these single cells 21 and the spacers 22.

The unit cell 21 is, for example, a laminate battery such as a lithium ion secondary battery. The unit cell 21, though not specifically shown, is provided with a laminated body formed by alternately stacking a positive electrode plate and a negative electrode plate with a separator interposed there between, and a laminate film for sealing the laminated body with electrolyte solution. A positive electrode tab connected to the positive electrode plate is derived from one end of the laminate film while the negative electrode tab connected to the negative electrode plate is derived from the opposite end of the laminate film. Note that the unit cell 21 may be composed of a nickel hydrogen battery, or lead battery or the like.

In the instant embodiment, after stacking the adjacent unit cells 21 with the direction of a positive electrode tab and that of a negative electrode tab alternated, by connecting directly the positive electrode tab and the negative electrode tab between the adjacent unit cells 21, each unit cell 21 will be joined in series. Further, the plurality of connected unit cells is electrically connected at its one end to a positive electrode side and negative electrode side output terminals 24, 25. Note that the electrical connection of the cells 21 is not particularly limited thereto.

Such plurality of unit cells 21, as shown in FIG. 2, are housed in the case 23 in a state in which spacers 22 are interposed for keeping the insulation of the unit cell 21 adjacent to each other.

The case 23 is composed of a lower case 231 having a box shape and an upper case 232 of lid shape. These lower and upper cases 231, 232 are formed, for example, of an aluminum plate.

In the instant embodiment, eight unit cells 21 are stacked and housed in the case 23. However, the number of cells 21 to be stacked is not particularly limited. For example, a single cell 21 may be contained in the case 23. The structure of the case is not particularly limited to the one described above, and the lower case and upper case, may be both formed in box shape and structured to meet both openings.

On the side on which the positive electrode and the negative terminals 24 and 25 are derived in an outer surface of the upper case 232, as shown in FIG. 2, a bolt support member 26 is attached. A bolt 261 provided on the bolt support member 26 is used when fixedly fastening the first and second connecting members 41,42 and the first and second reinforcing members 51, 52 by a nut 27.

The plurality of battery modules 2 in the instant embodiment, as shown in FIG. 1, the positive terminal 24 and the negative terminal 25 of adjacent battery modules 2 are laminated so as to be alternately arranged, respectively. That is, the plurality of battery modules 2 is laminated by reversing the direction alternately.

Further, when using the battery pack 1, in order for all the plurality of battery modules to be connected in series, the positive electrode terminal 24 and the negative electrode tab of adjacent battery modules 2 are connected one after another by a connecting member (not shown). Note that the electrical connection relationship between the battery modules is not limited thereto.

The first and second end plates 31 and 32, as shown in FIG. 3, have a generally the same area as the side face of the battery module 2 and are plate-like member having a cross-sectional shape of the U formed from a steel such as iron. These two end plates 31 and 32, as shown in FIGS. 1 and 3, are provided so as to sandwich from both sides of the stacking direction of the battery modules 2 provided so as to sandwich the module stack body 20 from both sides thereof in the stacking direction of the battery modules 2. The first end plate 31 is arranged on the left end of the FIG. 1 while the second end plate 32 is placed on the right end in the FIG. 1.

On the upper and lower ends of the first and second end plates 31 and 32, as shown in FIG. 3, through holes 341 and 342 are formed, respectively. The lower through hole 341 may receive a bolt 33 for insertion, which is used for fixing to the first connecting member 41 described below. Also, the upper through hole 342 may receive a bold 33 for insertion, which is used for fixing to the second connecting member.

The first and second connecting members 41 and 42 are a flat bar-like member provided along the stacking direction of the battery modules 2 and are connected to first and second end plates 31 and 32 described above, respectively. The first and second connecting members 41 and 42 are dimensioned to have approximately the same length of the battery module 2 of the module stack body 20 in the stacking direction, and are formed from steel such as iron. In the instant embodiment, the first connecting member 41 is arranged on the lower side in FIG. 1 while the second connecting member 42 is disposed on the upper side in FIG. 1.

The first connecting member 41, as shown in FIG. 3, is formed with through holes 431 at both ends in the stacking direction of battery modules 2, and a plurality of through holes (seven in this example) 441 are formed substantially equally spaced between the through holes 431 at the both ends 7. The plurality of through holes 441 are arranged to so as to correspond to the positions of the bolts 261 provided on each battery module 2A to 2G.

Both ends of the first connecting member 41 are fixed to the lower ends of the first and second end plates 31 and 32 using bolts 33 and nuts 28.

Specifically, after inserting the bolt 33 into the through hole 431 at one end of the first connecting member 41 and the through hole 341 of the first end plate 31, by fastening the bolt 33 and a nut 28 with the first connecting member 41 and the first end plate 31 being sandwiched, the first connecting member 41 is fixed to the first end plate 31 at its lower end.

Similarly, after inserting the bolt 33 into the through hole 431 at the other end of the first connecting member 41 and the through hole 341 of the second end plate 32, by fastening the bolt 33 and a nut 28 with the first connecting member 41 and the second end plate 32 being sandwiched, the first connecting member 41 is fixed to the lower end of the second end plate 32.

Also, the first connecting member 41 is connected by bolts 261 and nuts 27 of the battery modules 2A to 2G and fixed respectively to the battery module 2A to 2G.

Specifically, as shown in FIG. 3, after inserting into the through holes 441 of the first connecting member 41 bolts 261 respectively formed on the battery modules 2A to 2G, by fastening the bolts 261 and nuts 27 with the first connecting member 41 sandwiched, the first connecting member 41 is fixed to the battery modules 2A to 2G. Note that, with respect to the fixing portions of the reinforcing members 51, 52, after inserting a bolt 261 into the through hole 441 of the first connecting member 41 and through hole 541 of the reinforcing members 51, 52, fastening takes place.

The second connecting member 42, as shown in FIG. 3, is formed with through holes 432 at both ends in the stacking direction of battery modules 2, and a plurality of through holes (seven in this example) 442 are formed substantially equally spaced between the through holes 432 at the both ends 7. The plurality of through holes 442 are arranged to so as to correspond to the positions of the bolts 261 provided on each battery module 2A to 2G.

Further, both ends of the second connecting member 42 are fixed to the upper ends of the first and second end plates 31 and 32 using bolts 33 and nuts 28.

Specifically, after inserting the bolt 33 into the through hole 432 at one end of the second connecting member 42 and the through hole 342 of the first end plate 31, by fastening the bolt 33 and a nut 28 with the second connecting member 42 and the first end plate 31 being sandwiched, the second connecting member 42 is fixed to the first end plate 31 at its upper end.

Similarly, after inserting the bolt 33 into the through hole 432 at the other end of the second connecting member 42 and the through hole 342 of the second end plate 32, by fastening the bolt 33 and a nut 28 with the second connecting member 42 and the second end plate 32 being sandwiched, the second connecting member 42 is fixed to the upper end of the second end plate 32.

Also, the second connecting member 42 is connected by bolts 261 and nuts 27 of the battery modules 2A to 2G and fixed respectively to the battery module 2A to 2G.

Specifically, as shown in FIG. 3, after inserting into the through holes 442 of the second connecting member 42 bolts 261 respectively formed on the battery modules 2A to 2G, by fastening the bolts 261 and nuts 27 with the second connecting member 42 sandwiched, the second connecting member 42 is fixed to the battery modules 2A to 2G. Note that, with respect to the fixing portions of the reinforcing members 51, 52, after inserting a bolt 261 into the through hole 442 of the second connecting member 42 and the through hole 542 of the reinforcing members 51, 52, fastening takes place.

Note that if the battery modules 2A, 2G arranged on both ends of the plurality of the battery modules 2 each has at least one bolt 261 for being fixed to the first and second connecting members 41, 42, the first and second end plates may be omitted. The number of the battery modules 2 fixed to the first and second connecting members 41, 42 is not particularly limited. For example, all the battery modules 2A to 2G may be fixed to the first and second connecting members 41 and 42, or alternatively, every other battery modules 2 may be fixed to the first and second connecting members 41 and 42.

Also, when the first and second connecting members 41, 42 are connected to the first and second end plates 31, 32 respectively, the bolt 261 associated with battery modules 2A to 2G may be omitted.

The first and second reinforcing members 51 and 52, as shown in FIG. 1, are intended for connecting the first connecting member 41 and the second connecting member 42, and are formed from steel such as iron shaped in a flat plate.

The upper and lower ends of the first and second reinforcing members 51 and 52, as shown in FIG. 3, are provided with through holes 541, 542 for insertion of the bolts 261 provided on the battery modules 2, and, by using the bolt 261, the first and second reinforcing members 51 and 52 are fixed to the first and second connecting members 41, 42, respectively.

Specifically, as shown in FIG. 3, after the bolt 261 of the battery module 2 is inserted into a lower side through hole 541 of the first and second reinforcing members 51, 52 as well as the through hole 441 of the first connecting member 41, by fastening the bolt 261 and the nut 27, the first and second reinforcing members 51, 52 are respectively fixed to the first connecting member 41.

Similarly, after the bolt 261 of the battery module 2 is inserted into a upper side through hole 542 of the first and second reinforcing members 51, 52 as well as the through hole 442 of the second connecting member 42, by fastening the bolt 261 and the nut 27, the first and second reinforcing members 51, 52 are respectively fixed to the second connecting member 42.

Though not shown, the first and second connecting members 41, 42 as well as the first and second reinforcing members 51 and 52 as described above are also provided on the back side of the module stack body 20.

In the instant embodiment, by using the bolt 261 provided on the battery module 2, the first and second reinforcing members 51 and 52 are fixed to the first and second connecting members 41 and 42. However, the structure is not particularly limited thereto. For example, using a bolt separate from the battery module 2, the first and second reinforcing members 51 and 52 may be fixed to the first and second connecting members 41, 42.

In the instant embodiment, as shown in FIG. 1, the lower end of the first reinforcing member 51 (the first fixed point $P_1$) is fixed by the bolt 261 provided on the battery module 2C while the upper end (second fixed point $P_2$) of the first reinforcing member 51 is fixed by the bolt 261 provided on the battery module 2B. On the other hand, the lower end of the second reinforcing member 52 (the third fixed point $P_3$) is fixed by the bolt 261 provided on the battery module 2E while the upper end (second fixed point $P_2$) of the second reinforcing member 52 is fixed by the bolt 261 provided on the battery module 2F.

Thus, the first reinforcing member 51 and the second reinforcing member 52 are mounted so as to be separated from each other in the upward direction in FIG. 1. That is, the orientation of the X direction component (hereinafter referred to as the vector Va.) of a vector (hereinafter referred to as the vector VA) directing from the first fixed point $P_1$ toward the second fixed point $P_2$ and the orientation of the X direction component (hereinafter, referred to as a vector Vb.) of a vector directing from the third fixed point $P_3$ toward the fourth fixed point $P_4$ (hereinafter referred to as the vector VB) are opposite to each other.

Note that, as long as the direction of the vector Va and the direction of the vector Vb are configured to be opposite to each other, the configuration is not limited to that described above. Note that the length of the first and second reinforcing members 51, 52 may be appropriately adjusted depending on the fixed positions of the upper and lower ends.

For example, the first reinforcing member 51 is fixed by the bolts 261 of adjacent battery modules 2B, 2C. However, by using the bolt 261 of the battery module 2B and the bolt 261 of the battery module 2D, the first reinforcing member 51 is fixed across the battery module 2C. Similarly, the first reinforcing member 51 may be fixed across more than two battery modules 2. At this time, the second reinforcing member 52 may be fixed across one or more battery modules 2.

Further, in the instant embodiment, the first and second reinforcing members 51 and 52 are mounted so as to separate from each other upwardly in FIG. 1. The construction is not limited thereto. For example, the first and second reinforcing members 51 and 52 may be attached so as to be oriented away from each other downward in the FIG. 1.

Further, as shown in FIG. 4, the first reinforcing member 51 may be of a substantially triangular shape and fixed to the first and second connecting members 41, 42 by a total of three fixed portions, i.e., by two bolts provided on the battery module 2B and one of the bolts 261 provided on the battery module 2C. Further, the second reinforcing member 52 may also be of a substantially triangular shape and may be fixed to the first and second connecting members 41, 42 by a total of three fixed portions, i.e., by one of the bolts 261 provided on the battery module 2E and two bolts 261 provided on the battery module 2F.

Similarly, at least one of the first and second reinforcing members 51 and 52 may be fixed to the first and second connecting members 41, 42 in four or more fixed points.

Now, a description is given of the operation of the instant embodiment.

In the instant embodiment, two connecting members 41 and 42 are provided to secure two end plates 31 and 32 located at both ends of the plurality of stacked battery modules 2A to 2G. Further, first and second reinforcing members are provided to connect these two connecting members 41, 42 to thereby for reinforcing the assembled battery pack 1.

As shown in FIG. 1, with respect to these two reinforcing members 51 and 52, the direction or orientation of the component vector Va along the X direction in the vector VA and the direction of the component vector Vb along the X direction in the vector VB are opposite to each other. Therefore, even when an external force along the stacking direction of the battery modules 2A to 2G in the assembled battery pack 1 is applied, it is possible to prevent the plurality of battery modules 2 from being tilted.

That is, for example, when an external force F is applied to the upper left position in the stacking direction of the battery modules 2A to 2G of the battery stack 1 in FIG. 1 (arrow F in the figure), the first reinforcing member 51, against the direction of the external force F, exhibits a counter-acting vector Va. Thus, the external force F is cancelled by the presence of the first reinforcing member 51. Therefore, the battery module 2A is prevented from being tilted due to the external force. Consequently, the chain reaction will be prevented from occurring in which multiple battery modules 2B to 2G will also be subject to tilting in response thereto. Therefore, it is possible to stably hold the battery modules 2A to 2G.

Further, in the instant embodiment, by using the bolts 261 attached to the battery modules 2A to 2G, the first and second connecting members 41, 42 and the first and second reinforcing members 51 and 52 are connected to each other. Accordingly, since the battery modules 2A to 2G are fixed directly with the connecting members 41, 42 and the reinforcing members 51 and 52, it is possible to hold the battery modules 2A to 2G more stably.

As shown in FIG. 5, by fixedly fastening one of the upper or lower ends of the first reinforcing member 51 and the one of the upper or lower ends of the second reinforcing member 52 at the same position (by the bolt attached to the battery module 2D) jointly, the first and second reinforcing members 51, 52 may be fixed to the first and second connecting members 41, 42 at a total of three fixed portions.

In this case, even when the number of battery modules 2 of the battery pack 1 is small, since it is possible to efficiently secure the vector Va of the first reinforcing member 51 and the vector Vb of the second reinforcing member 52, the battery modules 2 will be prevented from tilting due to an external force so that the battery modules 2A to 2G may be held stably.

Also, as shown in FIG. 6, the first and second reinforcing members 51 and 52 may be formed of a single or integral reinforcing member 53.

In this case, it is possible to reduce the number of components that form the assembled battery pack 1. Further, it is possible to improve workability in assembling the battery pack 1.

Even at the smaller number of battery modules 2 of the battery pack 1, since it is possible to secure the vector Va and the vector Vb efficiently by the reinforcing member 53, the battery modules 2 are prevented from tilting by an external force so that the battery modules 2A to 2G can be stably maintained.

The direction of the vector Va in the instant embodiment corresponds to an example of the direction of a component along the stacking direction of the battery modules in a first vector having the first fixed point as a start point and the second fixed point as end point according to the present invention whereas the direction of the vector Vb in the instant embodiment corresponds to an example of the direction of a component along the stacking direction of the battery modules in a second vector having the third fixed point as a start point and the fourth fixed point as end point according to the present invention.

Second Embodiment

Figure 7:
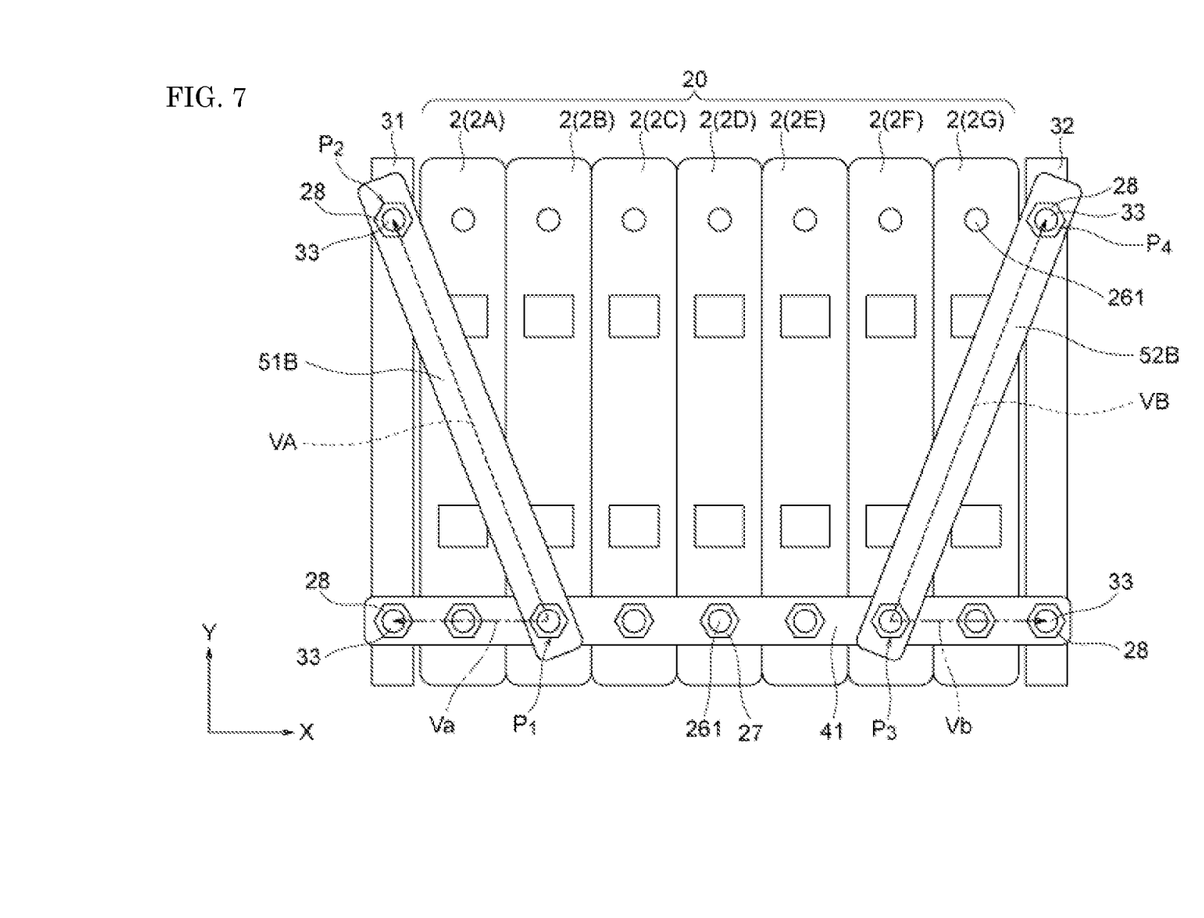
FIG. 7 is a front view showing the battery pack in the second embodiment according to the present invention.
Figure 8:
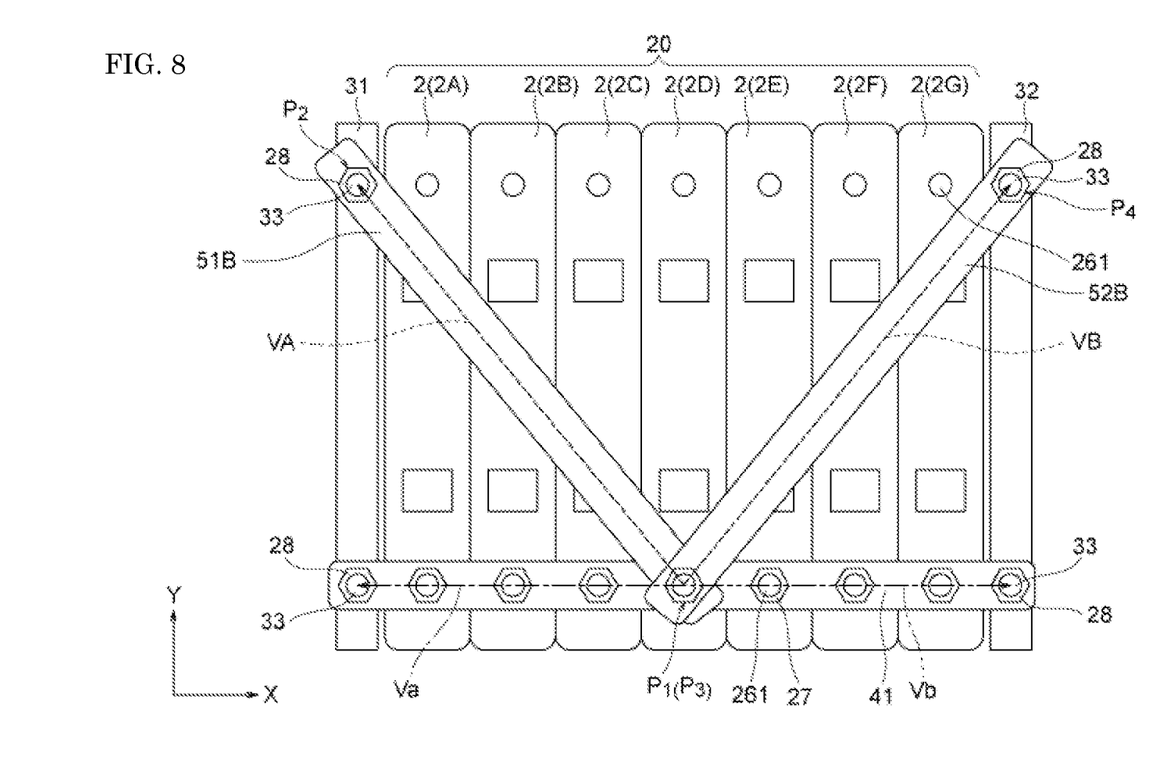
FIG. 8 is a front view showing a first modification of the reinforcing member in the second embodiment according to the present invention.

FIG. 7 is a front view showing a battery pack 1B of the instant embodiment, FIG. 8 is a front view showing a modification of the reinforcing member 51B, 52B in the instant embodiment. Except that the battery pack 1B of the second embodiment does not have a second connecting member 42 and the upper ends of the first and second reinforcing members 51B, 52B are fixed to either the first or second end plate, the construction is similar to that of the first embodiment described above. Therefore, a description is given only of the portion different from the first embodiment, and the same portion as the first embodiment is attached the same reference numeral with the corresponding description omitted.

The first and second reinforcing members 51B, 52B serves as, as shown in FIG. 7, members for connecting the first connecting member 41 and the first or second end plate 31 and 32, and are flat-shaped flat and formed from steel such as iron.

Though not shown specifically, the first and second reinforcing member 51B, 52B are respectively formed at the upper end with a through hole for insertion of the bolt 33 for connecting to the end plates 31, 32, and at the lower end with a through hole for insertion of the bolt 261 provided on the battery module 2.

The upper ends of the first and second reinforcing member 51B, 52B are fixed to the upper ends of the end plates 31, 32, respectively using bolts 33 and nuts 28.

Specifically, after inserting the bolt 33 into the through hole at one end of the first reinforcing member 51B and the through hole 342 of the first end plate 31, by fastening the bolt 33 and a nut 28 with the first reinforcing member 51B and the first end plate 31 being sandwiched, the first reinforcing member 51B is fixed to the first end plate 31 at its upper end.

Similarly, after inserting the bolt 33 into the through hole 431 at the upper end of the second connecting member 52B and the through hole 342 of the second end plate 32, by fastening the bolt 33 and a nut 28 with the second reinforcing member 52B and the second end plate 32 being sandwiched, the second reinforcing member 52B and the upper end of the second end plate 32.

The first and second reinforcing members 51B are fixed at respective lower end to the first connecting member 41 using the bolts to the first connecting member 261.

Specifically, after inserting a bolt 261 provided on the battery module 2 in the respective through hole provided at the lower ends of the first and second reinforcing members 51B, 52B in alignment with the through hole 441 of the first connecting member 41, and by securing the bolt 261 and a nut 27, the first and second reinforcing members 51B, 52B are fixed to the first connecting member 41, respectively.

Though not shown specifically, the first connecting member 41 as well as the first and second reinforcing members 51B, 52B are also provided on the back side of the module stack body 20.

In the instant embodiment, as shown in FIG. 7, the lower end of the first reinforcing member 51B (first fixing point $P_1a$) is fixed by the bolt 261 provided on the battery module 2B. Further, the second reinforcing member 52B is fixed by the bolt 261 at the lower end (third fixed point $P_3$) using the bolt 261 provided on the battery module 2F.

Further, as described above, the upper end (second fixed point $P_2$) is fixed to the upper end of the first end plate 31. In addition, the upper end of the second reinforcing member 52B (fourth fixed point $P_4$) of the second reinforcing member 52B is fixed to the upper end of the second end plate 32. Thus, in the instant embodiment as well, the orientation of the X direction component Va. of a vector VA directing from the first fixed point $P_1$ toward the second fixed point $P_2$ and the orientation of the X direction component Vb of a vector VB directing from the third fixed point $P_3$ toward the fourth fixed point $P_4$ are opposite to each other.

Therefore, even when an external force along the stacking direction of the battery modules 2A to 2G in the assembled battery pack 1B is applied, it is possible to prevent the plurality of battery modules 2 from being tilted and to stably hold the battery modules 2A to 2G.

Further, as shown in FIG. 7, in the front of the battery pack 1B in the instant embodiment, the first and second end plates 31, 32 are connected by using only the first connecting member 41. Therefore, it is possible to reduce the number of components constituting the battery pack. 1B. In addition it is possible to achieve improved workability during assembly of the battery pack 1B while reducing the weight of the battery pack 1B.

Further, in the instant embodiment, by using bolts 261 attached to the battery module 2A to 2G, the first connecting member 41 and the first reinforcing members 51B, 52B are connected to each other. Thus, since the battery modules 2A to 2G are fixed directly to the reinforcing member 51B, 52B, it is possible to hold more stably the battery modules 2A to 2G.

As shown in FIG. 8, by co-fastening the lower end of the reinforcing member 51B and the lower end of the reinforcing member 52B at the same position (i.e. at the position of the bolt 261 attached to the battery module 2D in the example), the first and second reinforcing members 51B, 52B may be fixed to the first connecting member 41, and the first and second end plates 31, 32 at a total of three fixed portions.

In this case, even when the number of battery modules 2 of the battery pack 1B is small, since it is possible to ensure the vector Va in the first reinforcing member 51B and the vector Vb in the second reinforcing member 52B efficiently, it is possible to prevent the battery module 2 from being tilted by an external force so as for the battery modules 2A to 2G to be secured stably.

The direction of the vector Va in the instant embodiment corresponds to an example of the direction of a component along the stacking direction of the battery modules in a first vector having the first fixed point as a start point and the second fixed point as end point according to the present invention whereas the direction of the vector Vb in the instant embodiment corresponds to an example of the direction of a component along the stacking direction of the battery modules in a second vector having the third fixed point as a start point and the fourth fixed point as end point according to the present invention. The bolt 261 in the instant embodiment corresponds to an example of the bolt according to the present invention.

Note that the embodiments described above are presented in order to facilitate understanding of the present invention and are not intended to limit the present invention. Therefore, each element disclosed in the above embodiments is deemed to also include all design modifications and equivalents belonging to the technical scope of the present invention.

For example, on one side of the module stack body 20, the structure described in the first embodiment (so as to be configured to include two connecting members 41, 42 and two reinforcing members 51 and 52) may be provided, and, on the other surface of the module stack body 20, the structure described in the second embodiment (so as to be configured to include a single connection member 41 and two reinforcing members 51B, 52B) may be provided.

The invention claimed is:

1. A battery pack, comprising:
   a first end plate provided on one end of a module stack body;
   a second end plate provided on the other end of the module stack body;
   the module stack body having a plurality of stacked battery modules stacked in a stacking direction;
   a first connecting member that is disposed in a side surface of the module stack body and extending in the stacking direction of the plurality of stacked battery modules to hold the plurality of stacked battery modules;
   a second connecting member disposed in the side surface of the module stack body and extending in the stacking direction of the plurality of stacked battery modules to hold the plurality of the stacked battery modules;
   a first reinforcing member that is fixed to the first connecting member at a first fixed point and fixed to the second connecting member at a second fixed point;
   a second reinforcing member that is fixed to the first connecting member at a third fixed point and fixed to the second connecting member at a fourth fixed point;
   a first fixing bolt for fastening the first end plate and the first connecting member;
   a second fixing bolt for fastening the first end plate and the second connecting member;
   a third fixing bolt for fastening the second end plate and the first connecting member; and
   a fourth fixing bolt for fastening the second end plate and the second connecting member, wherein each of the axial directions of the first fixing bolt, the second fixing bolt, the third fixing bolt, and the fourth fixing bolts extends in a direction substantially perpendicular to the side surface and the stacking direction, wherein a first orientation of the first reinforcing member along the stacking direction of the stacked battery modules of a first vector directing from the first fixed point toward the second fixed point and a second orientation of the second reinforcing member along the stacking direction of the stacked battery modules of a second vector directing from the third fixed point toward the fourth fixed point are opposite to each other, and wherein the first connecting member and the second connecting member are flat bar-like members.

2. The battery pack according to claim 1, wherein the first reinforcing member and the second reinforcing member are formed of an integral member.

3. The battery pack according to claim 1, wherein the first fixed point and the third fixed point are a first same point, or the second fixed point and the fourth fixed point are a second same point.

4. The battery pack according to claim 1, wherein a first battery module of the plurality of stacked battery modules has a first bolt protruding toward the first connecting member and a second bolt protruding toward the second connecting member, and wherein the first bolt is configured to fix the first connecting member to at least one of the first reinforcing member and the second reinforcing member, and the second bolt is configured to fix the second connecting member to at least one of the first reinforcing member and the second reinforcing member.

5. A battery pack, comprising:
   a module stack body having a plurality of stacked battery modules stacked in a stacking direction;
   a first end plate disposed on one end of the module stack body;
   a second end plate disposed on the other end of the module stack body;
   a connecting member that is disposed in a side surface of the module stack body so as to extend in the stacking direction of the plurality of stacked battery modules and fixes the first end plate and the second end plate;
   a first reinforcing member fixed to the connecting member at a first fixed point and fixed to the first end plate at a second fixed point;
   a second reinforcing member fixed to the connecting member at a third fixed point and fixed to the second end plate at a fourth fixed point;
   a first fixing bolt for fastening the first end plate and the connecting member; and
   a second fixing bolt for fastening the second end plate and the connecting member, wherein each of the axial directions of the first fixing bolt and the second fixing bolt extends in a direction substantially perpendicular to the side surface and the stacking direction, wherein a first orientation of the first reinforcing member along the stacking direction of the stacked battery modules of a first vector directing from the first fixed point toward the second fixed point and a second orientation of the second reinforcing member along the stacking direction of the stacked battery modules of a second vector directing from the third fixed point toward the fourth fixed point are opposite to each other, and wherein the connecting member is a flat bar-like member.

6. The battery pack according to claim 5, wherein the first fixed point and the third fixed point are a same point.

7. The battery pack according to claim 5, wherein the stacked battery modules have a bolt protruding toward the connecting member and the bolt is configured to fix the connecting member and at least one of the first reinforcing member and the second reinforcing member.

* * * * *